United States Patent
Rash et al.

(10) Patent No.: US 10,223,431 B2
(45) Date of Patent: Mar. 5, 2019

(54) DATA STREAM SPLITTING FOR LOW-LATENCY DATA ACCESS

(71) Applicant: Facebook, Inc., Menlo Park, CA (US)

(72) Inventors: Samuel Rash, Fremont, CA (US); Dhruba Borthakur, Sunnyvale, CA (US); Zheng Shao, Palo Alto, CA (US); Eric Hwang, San Jose, CA (US)

(73) Assignee: Facebook, Inc., Menlo Park, CA (US)

( * ) Notice: Subject to any disclaimer, the term of this patent is extended or adjusted under 35 U.S.C. 154(b) by 400 days.

(21) Appl. No.: 13/756,340

(22) Filed: Jan. 31, 2013

(65) Prior Publication Data

US 2014/0214752 A1 Jul. 31, 2014

(51) Int. Cl.
*G06F 17/30* (2006.01)

(52) U.S. Cl.
CPC ............... *G06F 17/30563* (2013.01)

(58) Field of Classification Search
CPC ......... G06Q 30/0242; G06Q 10/06315; G06Q 30/0201; G06Q 50/01; G06Q 10/087; G06Q 30/0206; G06Q 30/0251; G06Q 10/00; G06Q 10/04; G06Q 10/0631; G06Q 10/06316; G06Q 10/0637; G06Q 20/102; G06Q 20/34; G06Q 30/0253; G06Q 30/0255; G06Q 30/0261; G06Q 30/0269; G06Q 30/0277; G06Q 40/025; G06Q 40/04; G06Q 40/06; G06Q 50/02; G06Q 50/06; G06Q 50/2053; G06Q 50/22; G06Q 17/30563; G06Q 10/10; G06Q 30/0236; G06Q 20/108; G06Q 20/3221;
(Continued)

(56) References Cited

U.S. PATENT DOCUMENTS 6,212,515 B1 * 4/2001 Rogers .............. G06F 17/30457
6,698,815 B1 3/2004 Mills
(Continued)

FOREIGN PATENT DOCUMENTS

CN 101517569 A 8/2009
JP 2006318312 A 11/2006
(Continued)

OTHER PUBLICATIONS

Extended European Search Report dated Mar. 17, 2015, for European Patent Application No. 14 153 275.4, 8 pages.
(Continued)

*Primary Examiner* — Backhean Tiv
*Assistant Examiner* — Linh T. Nguyen
(74) *Attorney, Agent, or Firm* — FisherBroyles, LLP

(57) ABSTRACT

Techniques for facilitating and accelerating log data processing by splitting data streams are disclosed herein. The front-end clusters generate large amount of log data in real time and transfer the log data to an aggregating cluster. The aggregating cluster is designed to aggregate incoming log data streams from different front-end servers and clusters. The aggregating cluster further splits the log data into a plurality of data streams so that the data streams are sent to a receiving application in parallel. In one embodiment, the log data are randomly split to ensure the log data are evenly distributed in the split data streams. In another embodiment, the application that receives the split data streams determines how to split the log data.

18 Claims, 7 Drawing Sheets

(58) Field of Classification Search
CPC ...... G06Q 40/02; G06Q 50/24; G06Q 20/203; G06Q 30/0256; G06Q 10/063; G06Q 30/0202; G06Q 30/00; G06Q 30/0246; G06Q 40/00; G06Q 40/08; H04L 12/6402; H04L 45/306; H04L 45/54; H04L 45/60; H04L 45/745; H04L 49/15; H04L 67/1002; H04L 67/2838; H04L 67/306; H04L 63/1425; H04L 65/1083; H04L 65/4084; H04L 67/22; H04L 63/0281; H04L 45/7453; H04L 47/2441; H04L 67/2814; H04L 67/2842; G06F 17/30575; G06F 17/3033; G06F 17/30336; G06F 9/5083; G06F 17/30899; G06F 11/3476; G06F 17/30091; G06F 17/30073; G06F 17/30707; G06F 11/3438; G06F 2221/0775; G06F 17/30598; G06F 17/30952; G06F 17/40; G06F 2201/875; G06F 2201/805; G06F 17/30949; G06F 17/30097; G06F 3/064; G06F 21/78
USPC ........ 705/37, 38, 7.29, 7.33, 1.1, 7.31, 26.1, 705/35; 707/927, 999.01, 999.103, 707/E17.107, 705, E17.001, E17.008, 707/600, 737, E17.117, E17, 610; 709/217, 218, 219, 203, 201, 224, 238, 709/215, 227; 714/E11.204; 711/118, 711/216
See application file for complete search history.

(56) References Cited

U.S. PATENT DOCUMENTS

| | | | |
|---|---|---|---|
| 6,978,458 B1 | 12/2005 | Gosh et al. | |
| 7,127,492 B1* | 10/2006 | Calo et al. | 709/213 |
| 7,139,791 B1* | 11/2006 | Coleman | H04L 29/06027 709/203 |
| 7,506,355 B2 | 3/2009 | Ludvig et al. | |
| 7,555,456 B2* | 6/2009 | Rosenthal | G06Q 40/025 705/37 |
| 7,752,299 B2* | 7/2010 | Bookman et al. | 709/203 |
| 7,895,350 B1* | 2/2011 | Bereiter | H04L 65/608 709/231 |
| 1,024,646 A1 | 10/2011 | Hsieh et al. | |
| 8,156,216 B1 | 4/2012 | Error et al. | |
| 8,392,530 B1* | 3/2013 | Manapragada | H04L 65/4076 348/211.3 |
| 8,429,162 B1* | 4/2013 | Wang et al. | 707/737 |
| 8,775,556 B1* | 7/2014 | Matthews | G06Q 30/0201 709/217 |
| 8,775,941 B1* | 7/2014 | Deshpande et al. | G06F 3/00 715/736 |
| 8,850,263 B1 | 9/2014 | Kaufmann et al. | |
| 8,893,131 B2* | 11/2014 | Ramakrishnan | G06F 17/30339 707/812 |
| 9,104,745 B1 | 8/2015 | Gutti et al. | |
| 9,609,050 B2 | 3/2017 | Rash et al. | |
| 2002/0002622 A1 | 1/2002 | Vange et al. | |
| 2002/0055980 A1* | 5/2002 | Goddard | 709/217 |
| 2002/0184327 A1* | 12/2002 | Major | H04L 29/06 709/213 |
| 2004/0098371 A1* | 5/2004 | Bayliss | G06F 17/30545 |
| 2004/0103426 A1* | 5/2004 | Ludvig | H04H 20/86 725/9 |
| 2004/0199533 A1* | 10/2004 | Celis et al. | 707/101 |
| 2004/0215640 A1* | 10/2004 | Bamford | G06F 17/30575 |
| 2004/0230744 A1* | 11/2004 | Teh | G06F 17/30902 711/118 |
| 2005/0240631 A1* | 10/2005 | Willard et al. | 707/200 |
| 2006/0031719 A1* | 2/2006 | Bower et al. | 714/39 |
| 2006/0206923 A1 | 9/2006 | Thompson et al. | |
| 2006/0236074 A1* | 10/2006 | Williamson et al. | 711/216 |
| 2007/0027843 A1* | 2/2007 | Auerbach | G06F 17/30563 |
| 2007/0027974 A1* | 2/2007 | Lee | H04L 41/0681 709/223 |
| 2007/0124437 A1* | 5/2007 | Chervets | 709/223 |
| 2007/0185852 A1* | 8/2007 | Erofeev | 707/4 |
| 2007/0288480 A1 | 12/2007 | Caplan et al. | |
| 2007/0299631 A1 | 12/2007 | Macbeth et al. | |
| 2008/0133693 A1 | 6/2008 | Douglass et al. | |
| 2008/0201299 A1* | 8/2008 | Lehikoinen | G06F 17/30038 |
| 2008/0256079 A1 | 10/2008 | Saha et al. | |
| 2008/0288500 A1* | 11/2008 | Sapounas | G06F 17/30 |
| 2009/0031175 A1* | 1/2009 | Aggarwal | G06F 17/18 714/47.2 |
| 2009/0070443 A1 | 3/2009 | Vanderhook et al. | |
| 2009/0157766 A1* | 6/2009 | Shen | G06F 11/2097 |
| 2010/0036742 A1 | 2/2010 | Ito et al. | |
| 2010/0146442 A1* | 6/2010 | Nagasaka et al. | 715/810 |
| 2010/0161565 A1 | 6/2010 | Lee et al. | |
| 2010/0235606 A1* | 9/2010 | Oreland | G06F 17/30336 711/173 |
| 2010/0250498 A1 | 9/2010 | Andersen et al. | |
| 2010/0312958 A1* | 12/2010 | Sakai | G06F 11/0727 711/112 |
| 2011/0128972 A1 | 6/2011 | Thornton et al. | |
| 2011/0145321 A1* | 6/2011 | Jiang | G06F 17/30902 709/203 |
| 2011/0190594 A1 | 8/2011 | Heit et al. | |
| 2011/0213785 A1 | 9/2011 | Kristiansson et al. | |
| 2011/0246460 A1* | 10/2011 | Hsieh et al. | 707/736 |
| 2011/0246816 A1 | 10/2011 | Hsieh et al. | |
| 2011/0246826 A1 | 10/2011 | Hsieh et al. | |
| 2011/0283082 A1* | 11/2011 | McKenney | G06F 12/1018 711/202 |
| 2012/0066411 A1 | 3/2012 | Jeide et al. | |
| 2012/0089564 A1 | 4/2012 | Bakalash et al. | |
| 2012/0158858 A1 | 6/2012 | Gkantsidis et al. | |
| 2012/0191572 A1 | 7/2012 | Mengerink et al. | |
| 2012/0204024 A1 | 8/2012 | Augenstein et al. | |
| 2012/0215779 A1 | 8/2012 | Lipstone et al. | |
| 2012/0226804 A1* | 9/2012 | Raja | H04L 43/028 709/224 |
| 2012/0246303 A1 | 9/2012 | Petersen et al. | |
| 2013/0030868 A1* | 1/2013 | Lyon | G06Q 30/0236 705/7.33 |
| 2013/0040269 A1 | 2/2013 | Kirkman et al. | |
| 2013/0046883 A1 | 2/2013 | Lientz et al. | |
| 2013/0198245 A1 | 8/2013 | Kagan et al. | |
| 2013/0238391 A1 | 9/2013 | Klumpp et al. | |
| 2014/0156798 A1* | 6/2014 | Jasinskyj | H04L 43/0876 709/218 |
| 2014/0181575 A1 | 6/2014 | Kalach et al. | |
| 2014/0188805 A1 | 7/2014 | Vijayan et al. | |
| 2014/0215007 A1 | 7/2014 | Rash et al. | |
| 2015/0120915 A1 | 4/2015 | Erb et al. | |
| 2017/0155707 A1 | 6/2017 | Rash et al. | |

FOREIGN PATENT DOCUMENTS

| | | |
|---|---|---|
| JP | 2008130094 A | 6/2008 |
| JP | 2008204206 B2 | 9/2008 |
| JP | 2008305352 B2 | 12/2008 |
| JP | 2011039820 A1 | 2/2011 |
| WO | 0139012 A2 | 5/2001 |

OTHER PUBLICATIONS

Advisory Action dated Oct. 8, 2015, for U.S. Appl. No. 13/756,304 of Rash, et al., filed Jan. 31, 2013.
Non-Final Office Action dated Jun. 9, 2016, for U.S. Appl. No. 13/756,304, of Rash, S., filed Jan. 31, 2013.
First Examination Report dated Oct. 10, 2017 for Australian Patent Application No. 2014212780 of Facebook Inc.
First Office Action dated Sep. 22, 2017 for Canadian Patent Application No. 2,897,338 of Facebook Inc.
Notice of Allowance dated Nov. 28, 2017 for Japanese Patent Application No. 2015-556052 of Facebook, Inc.

(56) References Cited

OTHER PUBLICATIONS

Office Action dated Oct. 23, 2017 for Mexican Patent Application No. MX/2017/076758 of Facebook, Inc.
Preliminary Office Action dated Oct. 22, 2017 for Israeli Patent Application No. 239811 of Facebook Inc.
First Office Action dated Jun. 2, 2017 for Chinese Patent Application No. 2014800071378 of Facebook Inc. filed Jan. 17, 2014.
U.S. Appl. No. 15/430,403 by Rash, et al., filed Feb. 10, 2017.
Notice of Allowance dated Dec. 21, 2016, for U.S. Appl. No. 13/756,304, of Rash, S., filed Jan. 31, 2013.
Borthakur, Dhruba et al., "Apache Hadoop Goes Realtime at Facebook," In: Proceedings of the 2011 ACM SIGMOD International Conference on Management of Data, Jun. 12-16, 2011, pp. 1071-1080.
International Search Report and Written Opinion dated Apr. 30, 2014, for International Patent Application No. PCT/US2014/012120 filed Jan. 17, 2014, pp. 1-9.
Final Office Action dated Jul. 7, 2015, for U.S. Appl. No. 13/756,304 of Rash, et al., filed Jan. 31, 2013.
Non-Final Office Action dated Dec. 4, 2014, for U.S. Appl. No. 13/756,304 of Rash et al., filed Jan. 31, 2013.
U.S. Appl. No. 13/756,304 of Rash, et al., filed Jan. 31, 2013.
Notice of Allowance dated Nov. 10, 2016, for U.S. Appl. No. 13/756,304, of Rash, S., filed Jan. 31, 2013.

* cited by examiner

DATA STREAM SPLITTING FOR LOW-LATENCY DATA ACCESS

FIELD OF THE INVENTION

This invention relates generally to data capturing and processing systems, and in particular to a data capturing and processing system capable of splitting the data into multiple data streams.

BACKGROUND

Developments in computer and networking technology have given rise to applications that require massive amounts of data storage. For example, tens of millions of users can create web pages and upload images and text to a social media website. Consequently, a social media website can accumulate massive amounts of data each day and therefore need a highly scalable system for storing and processing data. Various tools exist to facilitate such mass data storage.

Front end clusters of these social media website monitor user activities and produce log data based on the activities of social media users. The front end clusters transmit the log data to a centralized storage filer or a data warehouse. The centralized storage filer or data warehouse organizes the received log data and responds to requests from data processing applications. In order to accommodate the massive amounts of log data, large-scale data warehouses are commonly used to store the log data and service the data-intensive inquiries from the data processing applications.

Frameworks exist that support large-scale data-intensive distributed applications, by enabling applications to interact with a cluster of thousands of computers (also referred to as nodes) and petabytes of data. For instance, a framework called Hadoop utilizes a distributed, scalable, portable file system, called Hadoop Distributed File System (HDFS), to distribute a massive amount of data among data nodes (also referred to as slave nodes) in a Hadoop cluster. In order to reduce the adverse impact of a data node power outage or network failure (including switch failure), data in an HDFS is typically replicated on different data nodes.

Hive, an open source data warehouse system, was developed to run on top of Hadoop clusters. Hive supports data queries expressed in a scripted query language (SQL)-like declarative language called HiveQL. The Hive system then compiles the queries expressed in HiveQL into map-reduce jobs that can be executed on the Hadoop cluster, in a mathematical form of directed acyclic graph. The HiveQL language includes a type system that supports tables containing primitive types, collections such as arrays and maps, and nested compositions of types. In addition, the Hive system includes a system catalog, called Hive-Metastore, containing schemes and statistics, which is useful in data exploration and query optimization.

Coupled with the Hadoop cluster, the Hive system can store and analyze large amounts of data for a social networking system. For example, the Hive system can analyze the degree of connection between users to rank stories that users follow on the social networking system. The Hive system can analyze activity logs to gain insights into how services of the social networking system are being used to help application developers, page administrators and advertisers make development and business decisions. The Hive system can run complex data mining programs to optimize the advertisements shown to the users of the social networking system. The Hive system can further analyze the usage logs to identify spam and abuse of the social networking system.

The Hive system includes web-based tools for people without programming ability to author and execute Hive queries, for authoring, debugging and scheduling complex data pipelines, and for generating reports based on data stored in the Hive system and other relational databases like MySQL and Oracle.

However, the front end clusters sends the captured log data to the centralized data warehouse periodically, instead of in real time. Furthermore, it takes time for the data warehouse to organize the received log data before the data warehouse is able to respond to data inquiries for these log data. Therefore, the log data in the data warehouse is only available after a time period since the log data was captured. The time period can be an hour or even a day. The data processing and consuming applications can only access the log data with a significant latency.

Furthermore, the centralized data warehouse needs to maintain connections with the front end servers for continuously receiving the log data. In a modern social network, the number of front end servers can be thousands or even more. The data warehouse carries a significant burden of maintaining the connections. Such a burden of maintaining the connections impacts the overall performance of the data warehouse.

SUMMARY

The technology introduced here provides the benefits of log data access and processing in real time or near real time. In particular, the technology introduced here includes front-end clusters that generate a large amount of log data in real time and transfer the log data to an aggregating cluster. When the aggregating cluster is not available, the front-clusters write the log data to local filers and send the data when the aggregating cluster recovers. The aggregating cluster is designed to aggregate incoming log data streams from different front-end servers and clusters. The aggregating cluster further sends the aggregated log data stream to centralized NFS ("Network File System") filers or a data warehouse cluster. The local filers and the aggregating cluster stage the log data for access by applications, so that the applications do not wait until the data reach the centralized NFS filers or data warehouse cluster.

In accordance with the techniques introduced here, therefore, a method for staging log data is provided. The method produces log data based on real-time user activities at a plurality of front end servers. The front end servers transmit the log data to an aggregating server. The aggregating server aggregates the log data at the aggregating server. The aggregating server further stages the log data so that a back end server can access the log data in real time. The aggregating server periodically sends the log data to a data warehouse. The data warehouse processes the log data so that the data warehouse can respond to a data query based on the processed log data.

In accordance with the techniques introduced here, therefore, a computer-implemented system for splitting data streams is also provided. The computer-implemented system includes a plurality of front end servers and at least one aggregating server. The front end servers are configured for producing log data based on real-time user activities. The aggregating server is configured for aggregating the log data received from at least some of the front end servers. The aggregating server is connected with at least some of the front end servers via a network. The aggregating server includes a data staging area configured for staging the log data. The aggregating server is further configured for splitting the log data into a plurality of log data streams so that one or more back end servers can retrieve the log data streams in parallel.

In accordance with the techniques introduced here, therefore, an aggregating server for staging log data is also provided. The aggregating server includes a processor, a network interface, a data storage and a memory. The network interface is coupled to the process, through which the aggregating server can communicate with a plurality of front end servers. The front end servers produce the log data based on real-time user activities. The data storage includes a data staging area. The memory stores instructions which, when executed by the processor, cause the aggregating server to perform a process including receiving log data from the front end servers, aggregating the log data, and staging the log data at the data staging area so that a back end server can access the log data in real time.

Other aspects of the technology introduced here will be apparent from the accompanying figures and from the detailed description, which follows.

BRIEF DESCRIPTION OF THE DRAWINGS

These and other objects, features and characteristics of the present invention will become more apparent to those skilled in the art from a study of the following detailed description in conjunction with the appended claims and drawings, all of which form a part of this specification. In the drawings:

DETAILED DESCRIPTION

References in this description to "an embodiment", "one embodiment", or the like, mean that the particular feature, function, or characteristic being described is included in at least one embodiment of the present invention. Occurrences of such phrases in this description do not necessarily all refer to the same embodiment, nor are they necessarily mutually exclusive.

Figure 1:
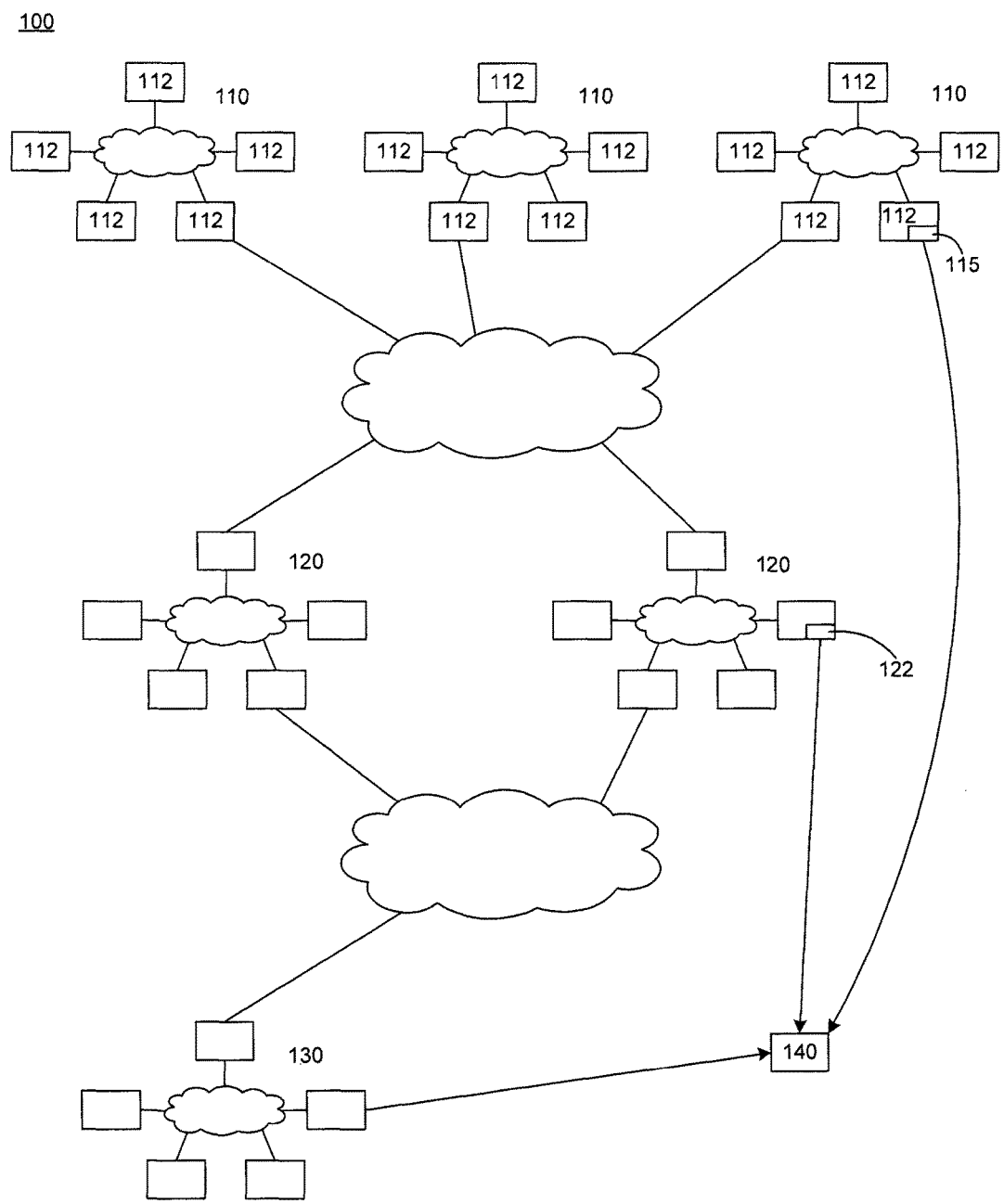
FIG. 1 illustrates an example of online data collection system.

FIG. 1 illustrates an example of online data collection system. The online data collection system 100 includes a plurality of front end clusters 110. Each front end cluster 110 includes multiple interconnected front end servers 112. In one embodiment, a front end cluster 110 can include from 5000 to 30000 front end servers 112. The front end cluster handles web traffic and produces log data in real time based on the user activities monitored by the online data collection system 100. In one embodiment, the front end clusters 110 are further responsible for providing user interface to the users of the system 100, including providing HTTP services.

The online data collection system 100 further includes a plurality of aggregating clusters 120 responsible for aggregating the log data, i.e. collecting and buffering log data for efficient network data transport. Each of the front end clusters 110 sends a request to at least one of the aggregating clusters 120 to determine whether the aggregating cluster 120 is available. If the aggregating cluster 120 is available, the front end cluster 110 streams the captured log data to the aggregating cluster 120 in real time. Each of the aggregating clusters 120 receives the streaming log data from multiple servers and aggregates the log data. In one embodiment, the aggregating of log data includes reorganizing the log data in terms of combining files and directories. The aggregated log data files do not necessarily have one to one mapping with incoming log data files. The aggregating clusters 120 are designed to scale to a very large number of server nodes and be robust to network and node failure. In one embodiment, the aggregating cluster 120 performs additional processing on the aggregated log data, including compressing the aggregated log data. In another embodiment, the aggregating cluster 120 performs no additional processing on the aggregated log data.

The aggregating clusters 120 then periodically copy the aggregated log data to a data warehouse 130, such as a Hive data warehouse implemented on a Hadoop cluster. In some embodiments, the Hive data warehouse can store petabytes of data. In some other embodiments, the aggregating clusters 120 send the aggregated log data to one or more NFS filers.

In some embodiments, the aggregating clusters 120 can be implemented as a two-level structure. One of the aggregating clusters is designated as a master aggregating cluster. The rest of the aggregating clusters are level 2 aggregating clusters. The master aggregating cluster is responsible for receiving log data from the front end clusters 110, and distributing the received log data to the level 2 aggregating clusters. The data consuming applications running on the back end servers retrieve the log data in real time from the level 2 aggregating clusters. This two-level structure of aggregating clusters provides a large bandwidth for the back end servers to pull down the log data from them. In some other embodiments, the data consuming applications running on the back end servers retrieve the log data in real time directly from the master aggregating cluster.

Back end servers 140 can send query requests to the data warehouse 130 for offline data analysis once the data warehouse 130 has received and processed the relevant log data. For faster log data access, each of the aggregating cluster 120 includes a data staging area 122. The data staging area 122 is an intermediate storage area within the aggregating cluster 120 for temporarily storing (also referred to as parking) the aggregated log data before processing. In one embodiment, the data staging area 122 can expand across servers of the aggregating cluster 120. The back end servers 140 can directly access the data staging area 122 for real-time or near real-time log data feed. The log data stored in the data staging area 122 may be removed after a predetermined time period. For instance, in one embodiment, the log data is removed 3 days after the log data was captured. In one embodiment, the back end servers 140 are part of the online data collection system 100. In another embodiment, the back end servers 140 are separated from the online data collection system 100.

In some embodiments, the servers 112 in the front end clusters 110 can further include a level one plus staging area 115. For instance, a front end server 112 in a front end cluster 110 is notified that its corresponding aggregating cluster 120 is unavailable. Instead of streaming the log data to the currently unavailable aggregating cluster 120, the front end server 112 temporarily stores the log data in the level one plus staging area 115. The level one plus staging area 115 can be directly accessed by back end servers. In other words, the back end servers 140 can directly stream the log data from the level one plus staging area 115, without the need of accessing the aggregating clusters 120 or the data warehouse 130. In some other embodiments, the frond end clusters 110 can further include a level zero staging area that can be directly accessed by servers from any levels within the system, with or without level one plus staging area In one embodiment, the online data collection system can prioritize the log data by dividing the data into multiple priority tiers. For instance, the top tier log data will have higher priority to be transmitted to data warehouse and back end servers. The top tier log data can also have longer retention time when the data is parking in the staging area. Lower tier log data will be deleted earlier after a shorter retention time period than the top tier log data. In some embodiments, the instructions on setting priority can be implemented in a policy system. When a data consuming application is submitted, a policy can be specified on the bandwidth as well as the priority tier for the category of data that it requests. The policy can further specify whether the requested log data is to be transmitted directly to the back end servers that the application runs in real time from a staged area, whether the requested log data is to be transmitted from the data warehouse, or whether the requested log data is to be staged on level one plus staging area or a staging area in the aggregating servers.

Figure 2:
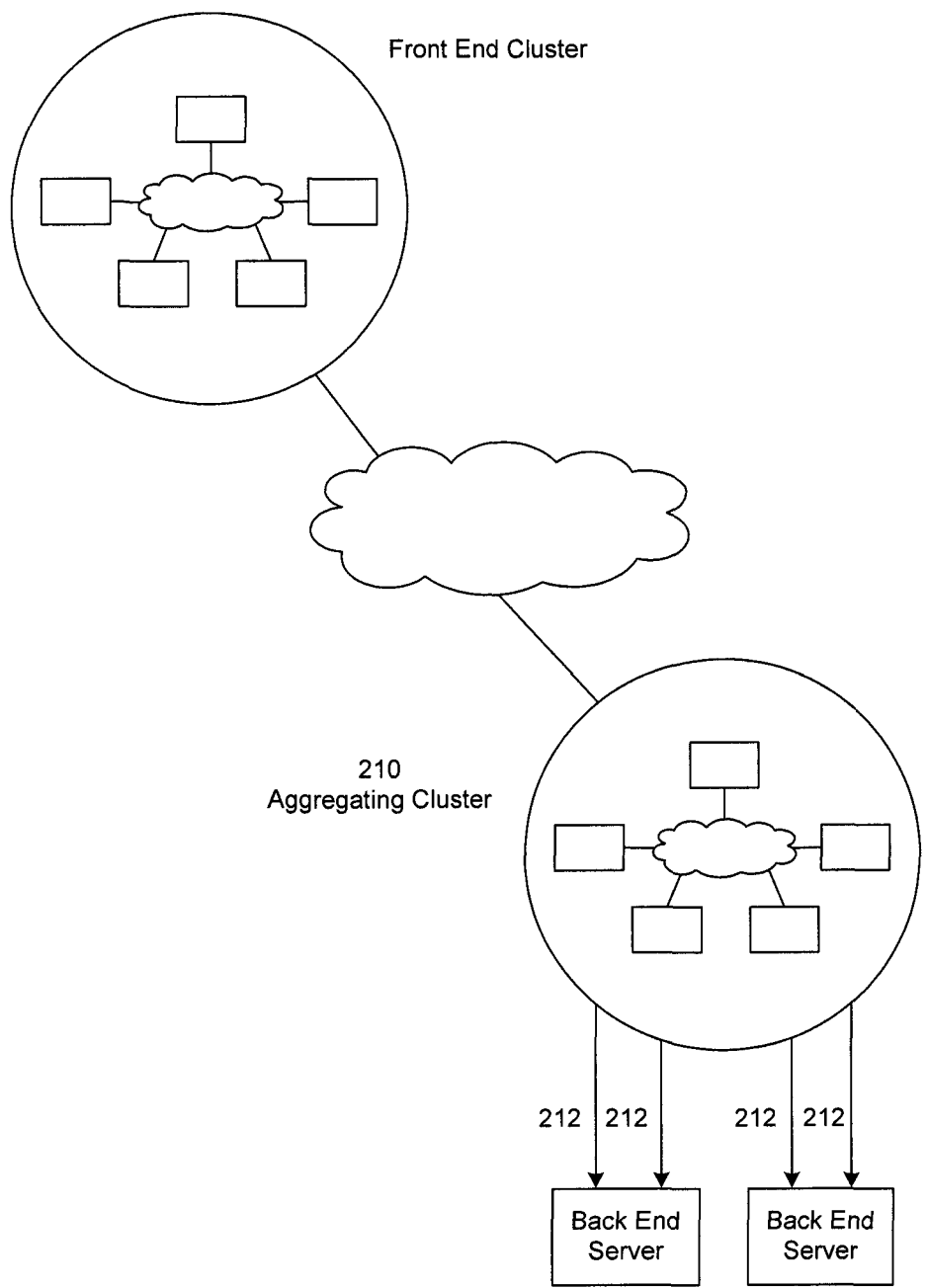
FIG. 2 illustrates an example of an aggregating cluster capable of splitting log data streams.
Figure 3:
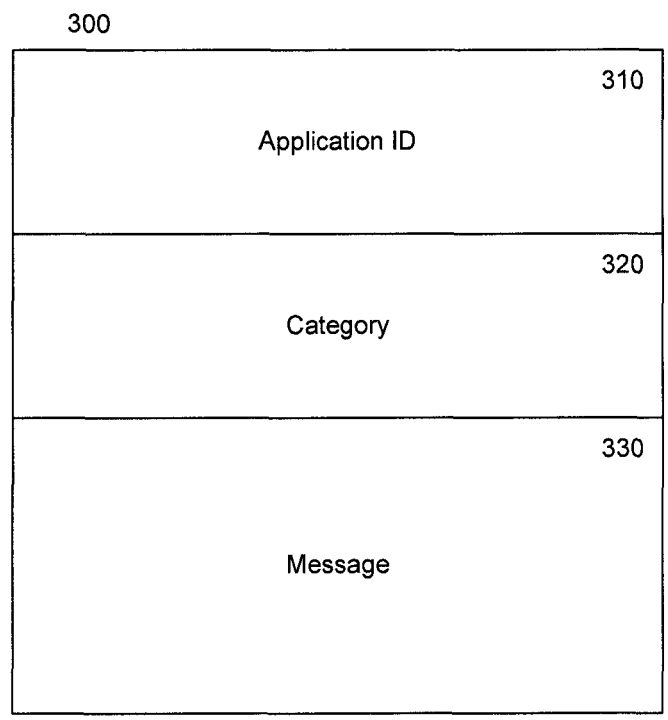
FIG. 3 illustrates an example structure of a log data entry.

To accelerate the processing of the log data, the aggregating cluster can split the log data into multiple log data streams so that the log data streams are sent in parallel to a data consuming application running on back end servers. FIG. 2 illustrates an example of an aggregating cluster capable of splitting log data streams. The aggregating cluster 210 splits the log data by examining the entries of the log data to ensure that the log data is evenly and randomly distributed in the split log data streams 212 (also referred to as buckets). FIG. 3 illustrates an example structure of a log data entry. The entry 300 of the log data includes an application ID 310, which identifies the data consuming application that is going to consume and process that log data entry. In one embodiment, the application ID 310 is a developer ID. The entry 300 further includes a category 320. The category 320 is a high level description of the intended destination of the message. The entry 300 further includes a message 330. The message 330 includes actual content of the log data entry.

In one embodiment, the aggregating server reads the application ID and category, and then calculate a hash function of the application ID and category. For instance, the hash function can be MurmurHash3 hash function which yields a 32-bit or 128-bit hash value. The aggregating server further mod the value of the hash function by the total number of buckets. The result is the bucket number that the log data entry is assigned. In other words, the log data entry is going to be included in the log data stream having that bucket number. The hash function reshuffles the entries of the log data such that the entries are evenly and randomly distributed among the buckets (i.e. the split log data streams). The assignment of the bucket numbers to the entries has no correlation in time when the entries are created or with application IDs of the entries. In some embodiments, the bucket number can be a function of data fields of the log data entries besides the application ID. For instance, the hash function can use the application ID and another data field of the log data entries to generate the hash value for determining bucket numbers.

The total number of buckets can be determined in various ways. In one embodiment, the total number of back end servers is determined by the estimated total data volume and data bandwidth that each back end server can handle. The number of buckets is determined as a number larger than the number of back end servers so that the system can scale up to include more back end servers. For instance, if the number of buckets is 1024, that means the system can scale up to 1024 back end servers without the need of making changes in the stream splitting. A plurality of back end servers can be utilized to process the split data streams in parallel in real time. The back end servers are equally loaded because the streams are evenly split. In another embodiment, when submitting the data consuming application, a policy can be specified for the data consuming application including the number of buckets for parallel processing the log data streams.

In another embodiment, the bucket number assigned to each log data entry is determined by random numbers. The aggregating server generates a random integer within the range of the total number of bucket and assigns that generated integer to a log data entry as the assigned bucket number.

In yet another embodiment, a data consuming application can specify the function or the way for assigning the bucket number. For instance, a data consuming application can assign the bucket numbers based on the certain IDs of the entries. The data consuming application can assign a first range of user IDs of the entries to a first bucket number; and assign a second range of user IDs of the entries to a second bucket number, etc.

Figure 4:
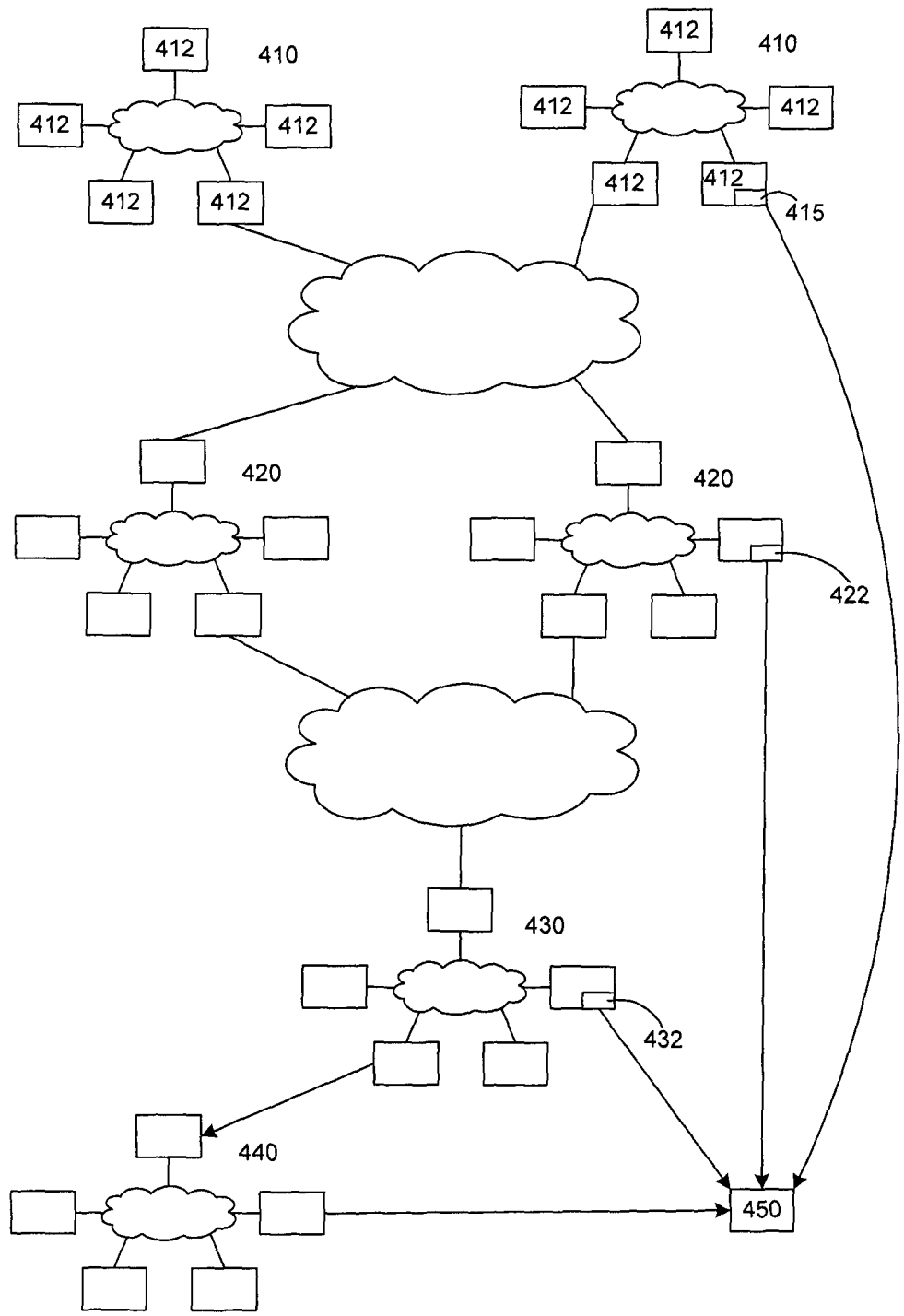
FIG. 4 illustrates another example of online data collection system having multiple layers of aggregating servers.

In one embodiment, the online data collection system can have more than one layer of middle servers similar to the aggregating servers in FIG. 1. FIG. 4 illustrates another example of online data collection system having multiple layers of aggregating servers. The online data collection system 400 includes a plurality of front end clusters 410. Each front end cluster 410 includes multiple interconnected front end servers 412. The front end cluster 410 produce log data in real time based on the user activities monitored by the online data collection system 100. In one embodiment, the servers 412 in the front end clusters 410 can further include a level one plus staging area 415 that can be directly accessed by back end servers 450.

The online data collection system 400 further includes a plurality of first level aggregating clusters 420 responsible for aggregating the log data transmitted from the front end clusters 410. Furthermore, the online data collection system 400 includes one or more second level aggregating clusters 430 responsible for aggregating the log data transmitted from the first level aggregating cluster 420. The second level aggregating clusters 430 then periodically copy the aggregated log data to a data warehouse 440, such as a Hive data warehouse implemented on a Hadoop cluster.

The first level aggregating cluster 420 includes first level data staging area 422 and the second level aggregating cluster 430 includes second level data staging area 432. Back end servers 450 can retrieve log data directly from the first level data staging area 422 or the second level data staging area 432. In one embodiment, a back end server 450 can decide whether it retrieves log data from the first level staging area or the second level staging area based on the network topology. For instance, if the back end server 450 is closer to the second level aggregating cluster 430 than the first level aggregating cluster 420 in terms of network topology, the back end server 450 decides to retrieve log data from the second level data staging area 432.

For example, in one example, the log data are user activity data and the data consuming application is a newsfeed application. Instead of waiting for the offline log data available on the data warehouse after a time period, the newsfeed application can request to retrieve the relevant user activity log data in real time from either the first or second level staging area, depending which aggregating cluster is closer to the newsfeed application's back end servers in the network topology. The newsfeed application pulls the user activity log data with very low latency and is able to process the log data and populate the newsfeed result as soon as possible.

In one embodiment, an online data collection system with multiple levels of aggregating clusters include front end clusters with level one plus staging capabilities. When an aggregating cluster is unavailable, the front end clusters can use its level one plus staging capabilities to continue feed log data to back end servers. In another embodiment, an online data collection system can even include more than two levels of aggregating clusters with data staging capabilities.

Such an online data collection system having multi-level staging capability can provide log data in real time at each stage of log data aggregation. The system can supply low latency data feed in response to data consuming queries in each stage, when the log data is not available from the central data repository (e.g. data warehouse) yet. The back end servers can choose a closer cluster for retrieving the stage log data in terms of the network topology. The back end servers' data streams travel through less nodes and systems in the network; thus, there is less chance of losing log data or corrupting the log data during the transmission. Therefore, the multi-level staging system enhances the durability and reliability of the log data transmission.

Figure 5:
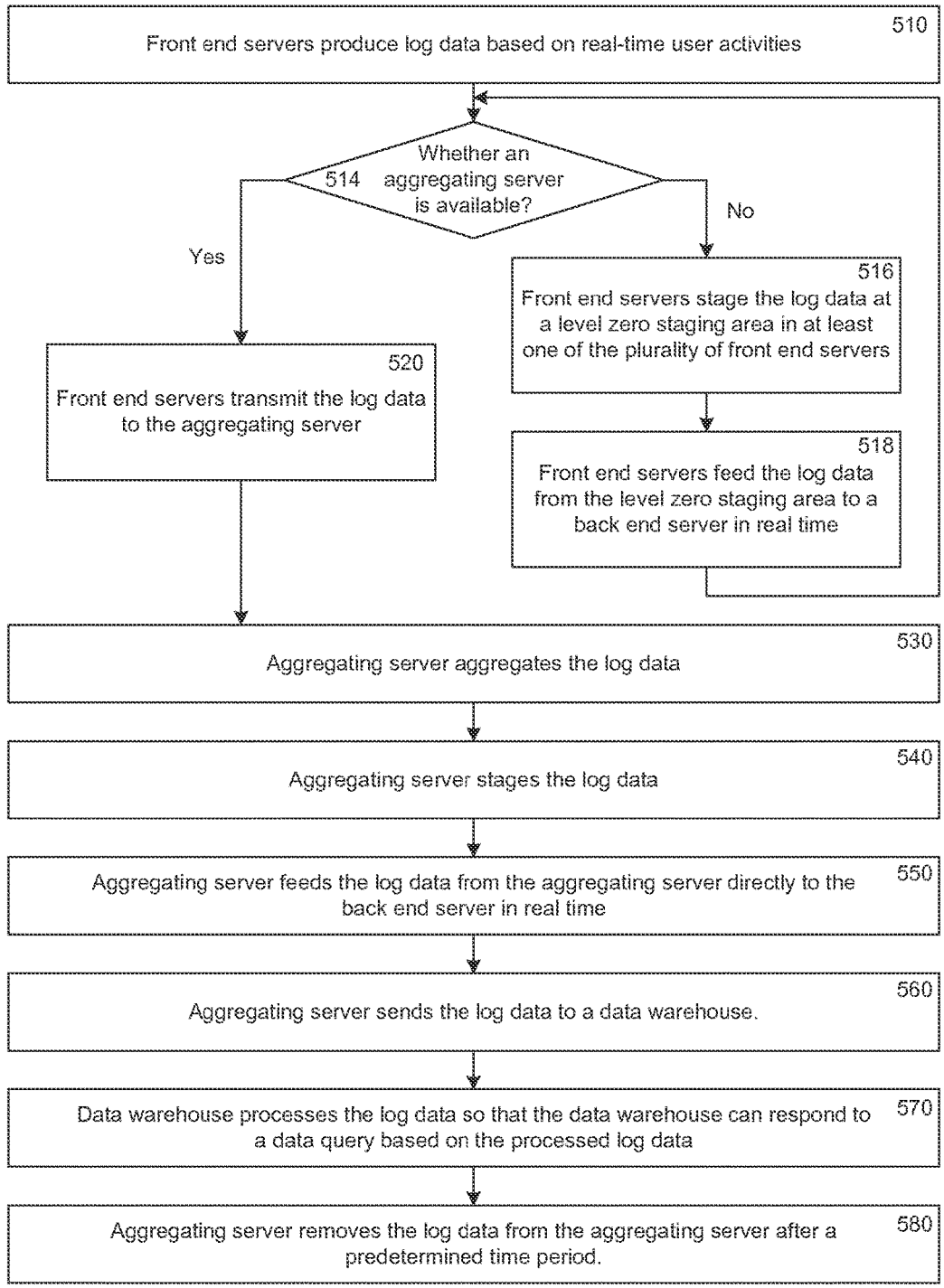
FIG. 5 illustrates an example process for aggregating and staging log data.

FIG. 5 illustrates an example process for aggregating and staging log data. At step 510, front end servers produce log data based on real-time user activities. In one embodiment, the front end servers further provide web content to users. In one embodiment, the front end servers divide the log data into a plurality of priority tiers, and only transmit the log data in a top tier of the priority tiers to an aggregating server.

At step 514, the front end servers check whether an aggregating server is available. If the aggregating server is unavailable, the front end servers stage the log data at a level one plus staging area in at least one of the plurality of front end servers at step 516. At step 518, the front end servers feed the log data from the level one plus staging area to a back end server in real time if the back end server requests. If the aggregating server is available, at step 520, the front end servers transmit the log data to the aggregating server.

At step 530, the aggregating server aggregates the log data. In one embodiment, the aggregating includes reorganizing the log data by combining streams of the log data at the aggregating server. In another embodiment, the aggregating server further compresses the log data at the aggregating server.

At step 540, the aggregating server stages the log data so that a back end server can access the log data in real time. In one embodiment, one back end server sends an instruction to the aggregating server and the front end servers regarding the data staging location for the log data. Then the aggregating server and the front end servers determines whether to stage the log data according to the instruction. At step 550, the aggregating server feeds the log data from the aggregating server directly to the back end server in real time.

At step 560, the aggregating server sends the log data to a data warehouse. At step 570, the data warehouse processes the log data so that the data warehouse can respond to a data query based on the processed log data.

At step 580, the aggregating server removes the log data from the aggregating server after a predetermined time period. If the front end servers stages the log data at the level one plus staging area, the front end servers also remove the log data from the level one plus staging area after a predetermined time period.

Figure 6:
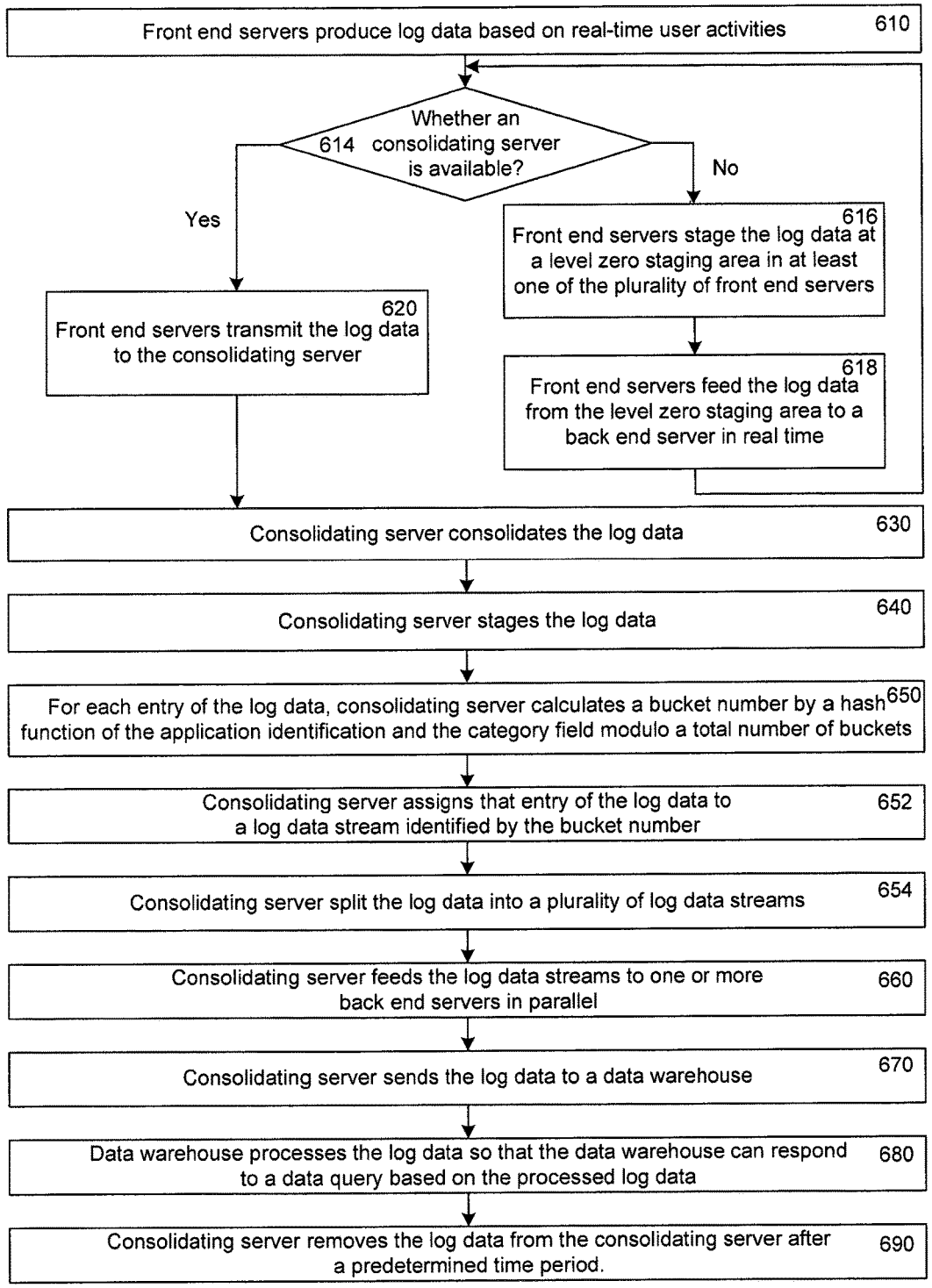
FIG. 6 illustrates an example process for staging and splitting log data.

FIG. 6 illustrates an example process for staging and splitting log data. At step 610, front end servers produce log data based on real-time user activities. In one embodiment, the front end servers further provide web content to users.

At step 614, the front end servers check whether an aggregating server is available. If the aggregating server is unavailable, the front end servers stage the log data at a level one plus staging area in at least one of the plurality of front end servers at step 616.

At step 618, the front end servers feed the log data from the level one plus staging area to a back end server in real time if the back end server requests. If the aggregating server is available, at step 620, the front end servers transmit the log data to the aggregating server.

At step 630, the aggregating server aggregates the log data. In one embodiment, the aggregating includes reorganizing the log data by combining streams of the log data at the aggregating server. In another embodiment, the aggregating server further compresses the log data at the aggregating server.

At step 640, the aggregating server stages the log data so that a back end server can access the log data in real time.

In one embodiment, the log data includes a plurality of log data entries. Each log data entry includes an application identification and a category field. The category field includes a high level description of an intended destination of the log data entry; the application identification identifies a data consuming application for processing the log data entry. The aggregate server can examine prefixes of entries of the log data to recognize the application identification and category field.

In one embodiment, at step 650, for each entry of the log data, the aggregating server calculates a bucket number by a hash function of the application identification and the category field modulo a total number of buckets. The total number of buckets is a total number of the plurality of log data streams. In one embodiment, the total number of buckets is determined by a number of back end servers that are available to receive the log data streams and a number of connections that each back end server is capable of handling. In another embodiment, the total number of buckets is instructed by a data consuming application running on at least one back end server. The purpose is that the back end servers are equally loaded when the back end servers receive and process the log data streams. At step 652, the aggregating server assigns that entry of the log data to a log data stream identified by the bucket number.

In another embodiment, for each log data entry, the aggregating server randomly generates an integer from 1 to a total number of buckets. Then the aggregating server assigns that log data entry to a log data stream identified by the bucket number.

At step 654, the aggregating server split the log data into a plurality of log data streams. In one embodiment, the aggregating server receives an instruction from a back end server regarding how to split the log data into the plurality of log data streams. In one embodiment, the front end servers can also split the log data into a plurality of log data streams, in ways similar to the aggregating server splitting the log data. At step 660, the aggregating server feeds the log data streams to one or more back end servers in parallel.

At step 670, the aggregating server sends the log data to a data warehouse. At step 680, the data warehouse processes the log data so that the data warehouse can respond to a data query based on the processed log data.

At step 690, the aggregating server removes the log data from the aggregating server after a predetermined time period. If the front end servers stage the log data at the level one plus staging area, the front end servers also remove the log data from the level one plus staging area after a predetermined time period.

In one embodiment, after the back end servers receive the split log data streams, the back end servers consolidate the split log data streams. Assuming the log data before splitting belong to a plurality of streams, each of the streams is assigned to one of the back end servers. When any of the back end servers receives a message of a split log data stream from the aggregating servers, it determines which back end server is assigned for the stream that the message belongs to. Then the back end server forwards the message to the assigned back end server (also referred to as the owner). In one embodiment, the back end servers consolidate the log data for one category into a queue. The queue can be implemented in various ways. For instance, the queue can be implemented in a naming convention analogous to files in a directory wherein the last file is the only potentially open file. Another way to implement the queue is to utilize a 2-layer system.

In some embodiments, in order to record the stream-to-server assignment information, the back end servers maintain a distribution map for the assignment information. The distribution map is updated when there is change on the assignment information, for example, when a server is unavailable, or when a new stream is added. The back end servers gets notification of these changes in a low latency manner.

This stream-to-server assignment mechanism provides an automatic and dynamic way for managing the relationship between the streams and back end servers. When one of the back end servers fails, the remaining back end servers can redistribute the ownership of the streams that were assigned to the failed back end server. By transferring the ownership of some streams from some back end servers to other back end servers, this mechanism can balance the work loads of the back end servers.

Figure 7:
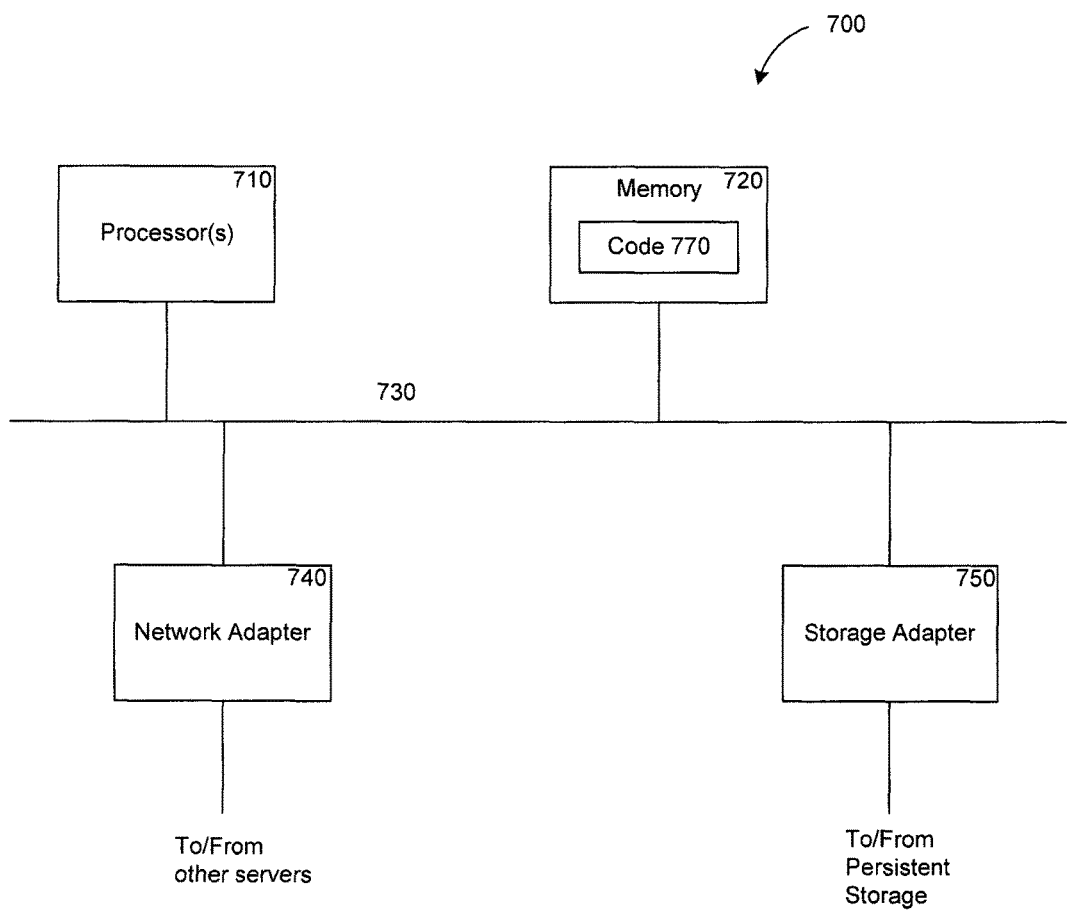
FIG. 7 is a high-level block diagram showing an example of the architecture of a computer server, which may represent any node or server described herein.

FIG. 7 is a high-level block diagram showing an example of the architecture of a server 700, which may represent any of the front end servers, aggregating servers, data warehouse servers, and back end servers. The server 700 includes one or more processors 710 and memory 720 coupled to an interconnect 730. The interconnect 730 shown in FIG. 7 is an abstraction that represents any one or more separate physical buses, point to point connections, or both connected by appropriate bridges, adapters, or controllers. The interconnect 730, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The processor(s) 710 is/are the central processing unit (CPU) of the server 700 and, thus, control the overall operation of the server 700. In certain embodiments, the processor(s) 710 accomplish this by executing software or firmware stored in memory 720. The processor(s) 710 may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices.

The memory 720 is or includes the main memory of the server 700. The memory 720 represents any form of random access memory (RAM), read-only memory (ROM), flash memory, or the like, or a combination of such devices. In use, the memory 720 may contain, among other things, code 770 embodying at least a portion of an operating system of the server 700. Code 770 may also include instructions for executing the techniques disclosed herein.

Also connected to the processor(s) 710 through the interconnect 730 are a network adapter 740 and a storage adapter 750. The network adapter 740 provides the server 700 with the ability to communicate with devices, such as other front end servers, consolidating servers, data warehouse servers, or back end servers, over a network and may be, for example, an Ethernet adapter or Fibre Channel adapter. In some embodiments, a server may use more than one network adapter to deal with the communications within and outside of the data storage cluster separately. The storage adapter 750 allows the server 700 to access a persistent storage, and may be, for example, a Fibre Channel adapter or SCSI adapter.

The code 770 stored in memory 720 may be implemented as software and/or firmware to program the processor(s) 710 to carry out actions described below. In certain embodiments, such software or firmware may be initially provided to the server 700 by downloading it from a system through the server 700 (e.g., via network adapter 740).

The techniques introduced herein can be implemented by, for example, programmable circuitry (e.g., one or more microprocessors) programmed with software and/or firmware, or entirely in special-purpose hardwired circuitry, or in a combination of such forms. Special-purpose hardwired circuitry may be in the form of, for example, one or more application-specific integrated circuits (ASICs), programmable logic devices (PLDs), field-programmable gate arrays (FPGAs), etc.

Software or firmware for use in implementing the techniques introduced here may be stored on a machine-readable storage medium and may be executed by one or more general-purpose or special-purpose programmable microprocessors. A "machine-readable storage medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible storage medium includes recordable/non-recordable media (e.g., read-only memory (ROM); random access memory (RAM); magnetic disk storage media; optical storage media; flash memory devices; etc.), etc.

The term "logic", as used herein, can include, for example, programmable circuitry programmed with specific software and/or firmware, special-purpose hardwired circuitry, or a combination thereof.

In addition to the above mentioned examples, various other modifications and alterations of the invention may be made without departing from the invention. Accordingly, the above disclosure is not to be considered as limiting and the appended claims are to be interpreted as encompassing the true spirit and the entire scope of the invention.

What is claimed is:

1. A method comprising:
producing, at a plurality of front end servers, log data based on real-time user activities;
transmitting the log data to an aggregating server;
aggregating the log data at the aggregating server;
splitting the log data into a plurality of log data streams based on bucket numbers by, for each entry of log data:
calculating a hash value of a category field and an application identification that identifies a data consuming application for processing the entry; and
determining a bucket number for the entry by calculating the hash value modulo a total number of buckets;
feeding the log data streams to at least one back end server in parallel;
staging the log data at the aggregating server and providing the at least one back end server with access to the log data in real time;
staging the log data at a specified data staging area in one of the front end servers in an event the aggregating server is not available, and providing the at least one back end server with access to the log data from the specified data staging area in real time;
sending the log data to a data warehouse; and
providing, by the data warehouse, the at least one back end server with access to the log data for offline data analysis;
wherein the log data staged at the aggregating server includes a plurality of log data entries, and each individual log data entry includes the category field and the application identification that identifies the data consuming application.

2. The method of claim 1, wherein the step of splitting comprises:
splitting the log data randomly so that the log data are evenly distributed to the plurality of log data streams.

3. The method of claim 1, further comprising:
receiving an instruction from the at least one back end server regarding how to split the log data into the plurality of log data streams.

4. The method of claim 1,
wherein the total number of buckets is a total number of the plurality of log data streams; and
the method further comprising assigning the respective entry of the log data to a log data stream identified by the bucket number.

5. The method of claim 4, wherein the category field includes a high level description of an intended destination of the log data entry.

6. The method of claim 1, wherein the total number of buckets is determined by a number of back end servers that are available to receive the log data streams and a number of connections that each back end server is capable of handling.

7. The method of claim 1, wherein the total number of buckets is instructed by a data consuming application running on the at least one back end server.

8. The method of claim 6, wherein the back end servers are equally loaded when the back end servers receive and process the log data streams.

9. The method of claim 1, further comprising:
examining prefixes of entries of the log data to determine the log data stream that the entries are assigned to.

10. The method of claim 1, further comprising:
sending the log data to a data warehouse; and
processing the log data at the data warehouse so that the data warehouse can respond to data queries based on the processed log data.

11. The method of claim 1, wherein the total number of buckets is instructed by a data consuming application running on one or more back end servers, and the total number of buckets is determined by a number of the back end servers that are available to receive the log data streams and a number of connections that each back end server of the back end servers is capable of handling.

12. The method of claim 1, further comprising sending the log data from the aggregating server to the data warehouse.

13. The method of claim 1, further comprising:
further aggregating the log data received from the aggregating server by at least one second level aggregating server, the second level aggregating server being connected with the aggregating server, wherein the second level aggregating server includes a second level data staging area configured for staging the log data so that the at least one back end server can access the log data in real time.

14. The method of claim 13, wherein the back end server can select an individual aggregating server from either the aggregating server or the second level aggregating server, and request to retrieve the log data in real time from the selected individual aggregating server, depending on which of the aggregating server or the second level aggregating server is closer to the at least one back end server in a network topology.

15. An aggregating server, comprising:
a processor;
a network interface, coupled to the processor, through which the aggregating server can communicate with a plurality of front end servers;
a data storage including a data staging area; and
a memory storing instructions which, when executed by the processor, cause the aggregating server to perform a process including:
receiving log data from the front end servers, wherein the front end servers produce the log data based on real-time user activities,
aggregating the log data,
staging the log data at the data staging area,
splitting the log data into a plurality of log data streams so that one or more back end servers can retrieve the log data streams in parallel based on bucket numbers by, for each entry of log data:
calculating a hash value of a category field and an application identification that identifies a data consuming application for processing the entry; and
determining a bucket number for the entry by calculating the hash value modulo a total number of buckets;
staging the log data at the aggregating server and providing the at least one of the back end servers with access to the log data in real time;
sending the log data to a data warehouse; and
wherein the log data staged at the aggregating server includes a plurality of log data entries, and each individual log data entry includes the category field and the application identification that identifies the data consuming application.

16. The aggregating server of claim 15, wherein the total number of buckets is a total number of the plurality of log data streams, and the aggregating server is further configured to assign the respective entry of the log data to a log data stream identified by the bucket number.

17. A computer-implemented system, comprising:
a plurality of front end servers configured for producing log data based on real-time user activities; and
multiple aggregating servers configured for aggregating the log data received from at least some of the front end servers, the aggregating servers being connected with at least some of the front end servers via a network;
wherein at least one of the aggregating servers includes a data staging area configured for staging the log data and providing one or more back end servers with access to the log data in real time, and at least one of the aggregating servers is configured for splitting the log data into a plurality of log data streams so that the one or more back end servers can retrieve the log data streams in parallel;
wherein at least one of the front end servers is configured to:
include a specified data staging area for staging the log data in an event the at least one of the aggregating servers is not available, and
provide the one or more back end servers with access to the log data from the specified data staging area in real time;
wherein the log data is split by, for each entry of log data:
calculating a hash value of a category field and an application identification that identifies a data consuming application for processing the entry; and
determining a bucket number for the entry by calculating the hash value modulo a total number of buckets;
at least one second level aggregating server configured for further aggregating the log data received from the multiple aggregating servers, the second level aggregating server being connected with the multiple aggregating servers, wherein the second level aggregating server includes a second level data staging area configured for staging the log data so that the back end server can access the log data in real time; and
a data warehouse for receiving the log data from the at least one aggregating server, the data warehouse providing the one or more back end servers with access to the log data for offline data analysis.

18. The computer-implemented system of claim 17, wherein the total number of buckets is a total number of the plurality of log data streams, and
the computer-implemented system further assigns the respective entry of the log data to a log data stream identified by the bucket number.

* * * * *